(12) United States Patent
Cuyt et al.

(10) Patent No.: US 10,773,423 B2
(45) Date of Patent: Sep. 15, 2020

(54) METHOD AND DEVICE FOR DOSING OF A POWDER FOR THE ADDITIVE MANUFACTURE OF A PRODUCT

(71) Applicant: 3D Systems, Inc., Rock Hill, SC (US)

(72) Inventors: Luc Cuyt, Oppuurs (BE); Kurt Verelst, Aarschot (BE); Jonas Van Vaerenbergh, Nieuwkerken-Waas (BE); Jozef Verheyen, Mortsel (BE)

(73) Assignee: 3D Systems, Inc., Rock Hill, SC (US)

( * ) Notice: Subject to any disclaimer, the term of this patent is extended or adjusted under 35 U.S.C. 154(b) by 216 days.

(21) Appl. No.: 16/001,758

(22) Filed: Jun. 6, 2018

(65) Prior Publication Data

US 2018/0345541 A1    Dec. 6, 2018

(51) Int. Cl.
*B29C 64/343* (2017.01)
*B29C 64/329* (2017.01)
(Continued)

(52) U.S. Cl.
CPC .......... *B29C 31/065* (2013.01); *B05C 19/008* (2013.01); *B22F 3/1055* (2013.01);
(Continued)

(58) Field of Classification Search
None
See application file for complete search history.

(56) References Cited

U.S. PATENT DOCUMENTS 3,217,364 A * 11/1965 Genest .................. B01J 8/0035
                                                           425/145
4,848,534 A *  7/1989 Sandwall ............. B65D 90/582
                                                           198/535
(Continued)

FOREIGN PATENT DOCUMENTS

CN      203345480      12/2013
CN      2045465115      8/2015
(Continued)

OTHER PUBLICATIONS

European Search Report and Written Opinion for EP 18176382.2 dated Oct. 17, 2018 (10 pages).

*Primary Examiner* — Mary Lynn F Theisen

(57) ABSTRACT

A device is provided for layered manufacture of at least a three-dimensional product by an additive manufacturing technique based on a powder. The invention therefore relates to a device for the layered manufacturer of a product based on a powder, in particular a metal powder.
This device is fitted with a build chamber with a vertically movable build platform on which said product is manufactured and contains a powder dispenser for application of the successive powder layers on the build platform in a horizontal build surface. The powder dispenser can be moved back and forth over the build surface along a horizontal dispensing direction in order to apply said powder layers. Moreover, the device contains a hopper that must contain said powder in order to supply powder to the powder dispenser. This hopper has a bottom with a dosing opening that lets out into the build chamber and that works in combination with a dosing valve. More specifically, the dosing valve enables a measured quantity of powder to flow out of the hopper.

26 Claims, 3 Drawing Sheets

(51) Int. Cl.
  *B29C 64/153* (2017.01)
  *B33Y 10/00* (2015.01)
  *B22F 3/105* (2006.01)
  *B33Y 30/00* (2015.01)
  *B29C 64/245* (2017.01)
  *B29C 64/205* (2017.01)
  *B33Y 40/00* (2020.01)
  *B29C 31/06* (2006.01)
  *B65D 90/58* (2006.01)
  *B05C 19/00* (2006.01)
  *B05C 19/04* (2006.01)
  *B05C 19/06* (2006.01)

(52) U.S. Cl.
  CPC .......... *B29C 64/153* (2017.08); *B29C 64/205* (2017.08); *B29C 64/245* (2017.08); *B29C 64/329* (2017.08); *B29C 64/343* (2017.08); *B33Y 10/00* (2014.12); *B33Y 30/00* (2014.12); *B65D 90/587* (2013.01); *B05C 19/04* (2013.01); *B05C 19/06* (2013.01); *B22F 2003/1056* (2013.01); *B22F 2003/1058* (2013.01); *B33Y 40/00* (2014.12)

(56) References Cited

U.S. PATENT DOCUMENTS

| | | | | |
|---|---|---|---|---|
| 5,323,939 | A * | 6/1994 | Young | B65D 90/582 |
| | | | | 222/463 |
| 6,213,168 | B1 * | 4/2001 | Gaylo | B29C 41/36 |
| | | | | 141/12 |
| 2013/0186514 | A1 * | 7/2013 | Zhuang | B05C 19/005 |
| | | | | 141/11 |
| 2014/0363585 | A1 * | 12/2014 | Pialot | B05C 19/04 |
| | | | | 427/551 |
| 2015/0375418 | A1 | 12/2015 | Hartmann | |
| 2017/0050270 | A1 | 2/2017 | Miyano et al. | |
| 2018/0015666 | A1 * | 1/2018 | Honda | B29C 64/205 |
| 2018/0185915 | A1 * | 7/2018 | Beauchamp | B33Y 40/00 |
| 2018/0304302 | A1 * | 10/2018 | Sachs | B29C 64/343 |
| 2019/0358901 | A1 * | 11/2019 | Dugan | B29C 64/153 |

FOREIGN PATENT DOCUMENTS

| | | |
|---|---|---|
| DE | 10201522100 | 11/2017 |
| EP | 3085517 | 10/2016 |
| JP | S438260 | 4/1968 |
| JP | 2000095294 | 4/2000 |

* cited by examiner

METHOD AND DEVICE FOR DOSING OF A POWDER FOR THE ADDITIVE MANUFACTURE OF A PRODUCT

CROSS REFERENCE TO RELATED APPLICATIONS

This patent application claims priority to Belgium patent application serial number BE2017/5403, filed on Jun. 6, 2017, and incorporated herein by reference.

SUMMARY

The invention also relates to a method for the manufacture of at least a three-dimensional product, where a measured quantity of powder for the manufacture of said product flows out of the hopper to a powder dispenser and the powder dispenser is moved over said build surface to apply powder layers to the build surface.

In order to build a three-dimensional product from successive layers, successive homogeneous powder layers of a uniform thickness must be deposited on a build surface. For this, a powder dispenser is provided in the build chamber, which can move along a dispensing direction over the build surface. This powder dispenser contains at least a dispensing member, such as a scraper or a pressure roller, in order to dispense the powder over the build surface and thus to create a powder layer during movement of the powder dispenser.

The powder is normally screened to remove impurities or large grains before this powder is supplied to the powder dispenser. Here, a production fraction of the powder, which will be used for the three-dimensional product, is separated from a rejected fraction that contains unsuitable powder with impurities and oversized grains.

When manufacturing large three-dimensional products, these products must be built on an adjusted, large build platform. This entails that an adjusted and relatively large quantity of powder must be dispensed in each powder layer.

When placing the build chamber under a vacuum in order to create the required modified atmosphere, air is drawn from the powder in the hopper. When a large quantity of powder is present in the hopper, this results in air being extracted from the powder mass, which sets the powder in motion in an uncontrolled manner in the hopper and causes it to behave as a boiling liquid. In addition, powder may be drawn along said dosing opening out of the hopper due to the drop in pressure in the build chamber. All of this may result in powder ending up on the building surface, creating an inaccurate dose for the powder layers applied later. This problem arises in particular during use of large powder quantities that are needed to manufacture large three-dimensional products.

The invention seeks to offer a device and a method that enable elimination of these drawbacks and that also enable accurate dosing of powder from the hopper in individual quantities that are required for application of a powder layer on the build surface, where powder is only fed to the powder dispenser on one side of the build platform.

To this end, in an intermediate position of the dosing valve, said dosing opening is completely covered by the dosing valve that extends laterally along both sides of the dosing opening across the bottom of the hopper. Here, a dosing space is present along both sides of the dosing opening, between this hopper bottom and the dosing valve. The dosing valve can go to a dosing position along both sides of the intermediate position, where this can be moved back and forth between the two dosing positions.

In particular, in these dosing positions of the dosing valve, the volume of the dosing space on the side of the dosing opening is less than the volume of this space in the intermediate position, while on the opposite side of the dosing opening, the volume of the opposite dosing space is larger than the volume of the latter in the intermediate position.

For this purpose, the dosing space may contain a specific quantity of powder and the dosing valve can be moved back and forth over the dosing opening between the two dosing positions. More specifically, due to the movement of the dosing valve to a dosing position, the volume of the dosing space is reduced on the side of the dosing opening opposite the side to which the dosing valve moves, while the volume of the dosing space increases on the latter side.

Advantageously, said dosing space is connected to the dosing opening.

Highly advantageously, said dosing space is formed by a dosing slit with a practically constant height that corresponds to the distance between said dosing valve and the bottom of said hopper.

According to a preferred embodiment of the device, the dosing valve is mounted so it can rotate, so that it can be subject to a pendulum motion between said dosing positions.

According to an interesting embodiment, the hopper extends laterally next to the build platform and the powder dispenser contains at least two inlet openings for the powder. A separator extends between these openings. Here, the powder dispenser can be moved to a filling position in which the separator extends practically centered under the dosing opening so that each of the inlet openings extends to an opposite side with respect to the dosing opening so that when the dosing valve is moving to a dosing position, powder from the dosing space on the side opposite the dosing opening can flow to the side to which the dosing valve is moving, to the inlet opening located under this dosing space. Here, each inlet opening lets out onto a corresponding compartment of the powder dispenser.

According to a specific embodiment of the invention, a first compartment of the powder dispenser lets out onto the build surface, while a second compartment can be closed on the bottom so that a quantity of powder can be stored in this second compartment.

Moreover, the hopper also contains a bleed channel that connects to the build chamber and extends into the vicinity of the dosing opening on the inside of the hopper. The bleed channel enables evacuation of air located in powder present in the hopper when lowering the air pressure in the build chamber and/or in the hopper.

The invention also relates to a method in which powder for the manufacture of said product is supplied to a hopper and the powder from the hopper flows to a powder dispenser, where the powder dispenser moves over said build surface to apply a powder layer to the build surface, as also required in the appended claims.

BRIEF DESCRIPTION OF FIGURES

Further details and advantages of the invention shall be indicated in the below description of some specific embodiments of the device and method, according to the invention. This description is only given as an example and does not restrict the scope of the protection claimed; the reference numerals used below pertain to the appended figures.

In the various figures, the same reference numerals pertain to the same or analogous members.

DETAILED DESCRIPTION OF THE PREFERRED EMBODIMENTS

Figure 1:
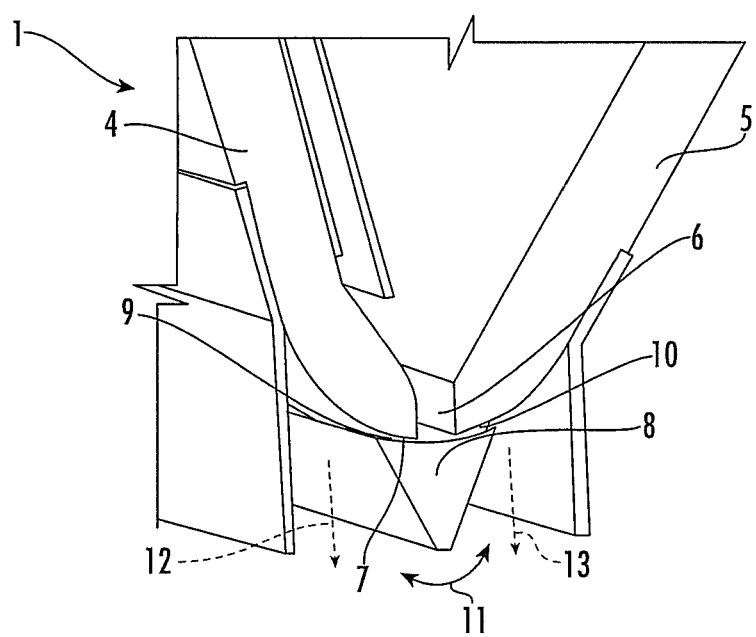
FIG. 1 is a schematic perspective image of a partial cross-section of a hopper with a dosing valve according to an embodiment of the invention, where the dosing valve is located in the intermediate position.

In general, the invention relates to a device and a method for dosing a powder in a powder dispenser, in order to provide a preferably homogeneous powder layer with a uniform thickness on a build surface in a build chamber. This is in order to build a three-dimensional product in layers by having an energy beam strike the successive powder layers, applied to the build surface, according to a pattern that corresponds to successive cross-sections of the product. As a result, the powder of these layers is fully or partly melted and subsequently solidified to create successive contiguous layers of the product. For this, the device is in a build chamber and is fitted with a hopper that must contain powder, as well as a dosing valve to supply the powder dispenser.

FIGS. 1 to 6 show a diagram of a preferred embodiment of a hopper 1 and a powder dispenser 2, according to the invention, for application in a device for the manufacture of three-dimensional products. The powder dispenser 2 is provided to apply said successive powder layers in the build surface, while said hopper 1 supplies the powder dispenser 2.

Said hopper 1 must therefore contain powder 3 for the manufacture of a three-dimensional product. The hopper 1 is located in a build chamber of a device which normally, during production of the product, is hermetically sealed and contains an inert atmosphere or is under low pressure.

In the build chamber, a vertically movable build platform is provided, on which the product is manufactured. For clarity in the figures, the build chamber and this platform are not shown.

The hopper 1 comprises two walls 4 and 5 that taper downwardly towards one another, between which an elongated dosing opening 6 extends on the bottom across practically the entire length of the hopper 1. The dosing opening 6 is therefore located on the bottom 7 of the hopper 1 and lets out into the build chamber.

Moreover, the hopper 1 is fitted with a dosing valve 8 that works with the dosing opening 6. This dosing valve 8 is elongated and extends over the entire length of the dosing opening 6.

The dosing valve 8 can be moved with respect to the dosing opening 6 along an axis transverse to the longitudinal axis of the latter and can therefore be moved with respect to the dosing opening 6 across the bottom 7 of the hopper 1.

Figure 3:
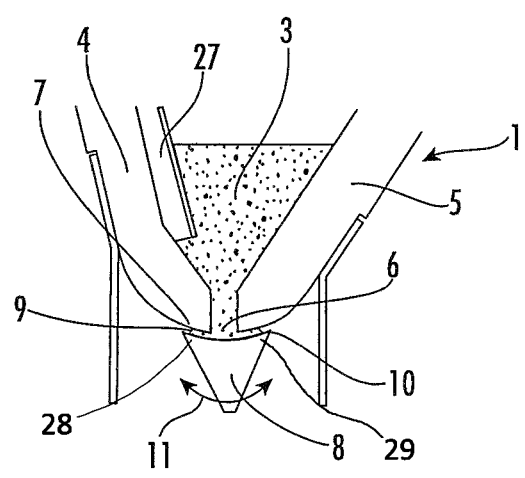
FIG. 3 shows a schematic cross-section for part of a hopper with a dosing valve in the intermediate position.

In an intermediate position of the dosing valve 8, as shown in FIGS. 1 and 3, this covers the dosing opening 6 completely and extends along both sides of the dosing opening 6 laterally across the bottom 7 of the hopper 1. Here, the dosing valve 8 is located at a short distance from the bottom 7 of the hopper 1 so that along both sides of the dosing opening 6, a dosing space 9 and 10 is present between this bottom 7 of the hopper 1 and the opposite surface of dosing valve 8. In the intermediate position the dosing spaces 9 and 10 present practically the same volume.

For this, the dosing valve 8 is mounted so it can rotate with respect to an axis of rotation that is parallel to the longitudinal axis of the dosing opening 6 and of the dosing valve 8. Here, the surface of the bottom 7 of the hopper 1 connecting to the dosing opening 6 is preferably of cylindrical design, as is the opposite surface of the dosing valve 8, such that when the dosing valve rotates around said axis of rotation, the distance between the surface of the bottom 7 of the hopper 1 connecting to the dosing opening 6 and the dosing valve 8 remains practically constant.

More specifically, for instance, the bottom 7 of the hopper 1 features a cylindrical convex surface, while the opposite surface of the dosing valve 8 is concave cylindrical, for instance.

Consequently, this ensures that a distance between the surface of the bottom 7 of the hopper 1 and the opposite surface of the dosing valve 1 is maintained so that direct contact cannot occur between these two surfaces. This prevents material particles from falling off of these surfaces due to their scraping or rubbing together. After all, these material particles could contaminate the powder 3 for manufacture of the product, which could result in inferior products with defects. Further, according to an interesting embodiment, the dosing valve 8 has opposite edges 28 and 29 that, in said intermediate position, extend along both sides of the dosing opening 6 at a level that is equal to, or above, the level of the dosing opening 6. These edges 28 and 29 extend, in particular, transverse to the direction of displacement of the dosing valve 8 when it is moved between both dosing positions. Preferably, these edges 28 and 29 also extend at the level of the dosing opening 6 or above this level in these dosing positions. In this way it is ensured that powder 3 cannot flow in an uncontrolled manner to the build chamber, in particular to the powder dispenser 2, when the dosing valve 8 moves between the two dosing positions or when it is in the intermediate position in rest.

Figures 4, 5:
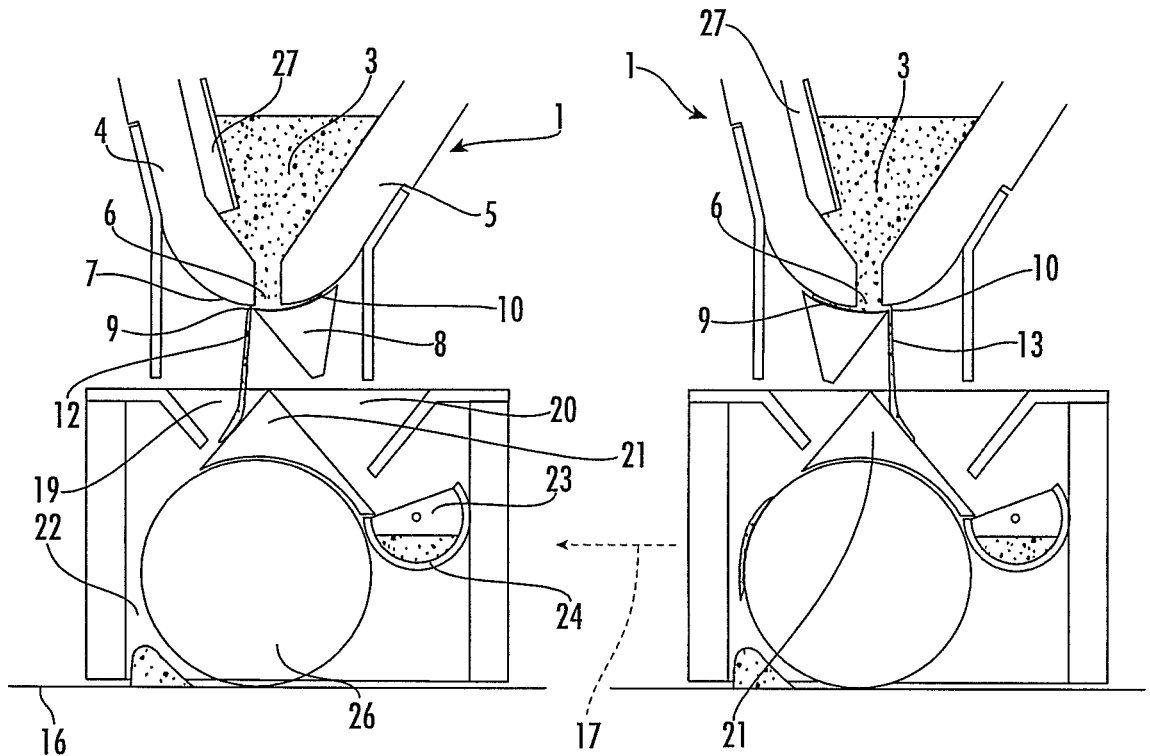
FIG. 4 is a schematic cross-section of a powder dispenser with part of a hopper, where the dosing valve is located in a first dosing position.
FIG. 5 is the same cross-section as in FIG. 4, but with the dosing valve located in a second dosing position.

The dosing valve 8 may therefore be subject to a pendulum motion, where this goes into a dosing position in an alternating manner along the two sides of said intermediate position, as shown in FIGS. 4 and 5.

In this dosing position, the dosing valve 8 is primarily located on one side of the dosing opening 6 so that this dosing valve 8 extends on the opposite side across a smaller area of the bottom 7 of the hopper 1, where the dosing opening 6 remains covered by the dosing valve.

In the dosing positions of the dosing valve 8, the volume of the dosing space 9 and 10, respectively, on a side of the dosing opening 6 is less than the volume of this space in the intermediate position, while on the opposite side of the dosing opening 6, the volume of the opposite dosing space 10 and 9, respectively, is larger than the volume of the latter in the intermediate position.

During movement of the dosing valve 8 to a first dosing position that is shown in FIG. 4, the volume of the dosing space 9 is reduced on the side of the dosing opening 6 opposite the side to which the dosing valve 8 moves, while the volume of the dosing space 10 increases on the latter side.

When the dosing valve 8 is subsequently moved to the opposite second dosing position, as shown in FIG. 5, the volume of the dosing space 10 is reduced on the side of the dosing opening 6 that is opposite the side to which the dosing valve 8 is moving. On this latter side, the volume of the dosing space 9 consequently increases during movement to the relevant dosing position.

The dosing valve 8 can therefore be moved back and forth, as indicated by arrow 11 in FIGS. 1 and 3, between the two dosing positions shown in FIGS. 4 and 5. During movement of the dosing valve 8 between the two dosing positions, it passes through said intermediate position each time and the dosing space 9,10 remains connected to the dosing opening 6, while the dosing opening remains completely covered by the dosing valve 8.

The dosing space 9,10 moves along with the dosing valve 8, back and forth along the intermediate position, and in this process, takes a measured quantity of powder 3 along from the dosing opening 6. This quantity of powder moves along with the dosing space 9,10 until the direction of movement of the dosing valve 8 changes when it reaches a dosing position. When the dosing valve 8 is rotating clockwise, a quantity of powder flows to the dosing space 10 on the right side, and when rotating counterclockwise, the dosing space 9 is filled with powder on the left side.

When powder flows through the dosing opening 6 to a side of the dosing space in this way during movement of the dosing valve 8, powder flows out of the opposite side of the dosing space downwards under the influence of gravity. Thus, this enables generation of a powder flow along both sides of the dosing valve 8 when the dosing valve 8 is subject to a pendulum motion between the two dosing positions. Thus, in this process, a dosed powder flow 12 and 13 arises on each side of the dosing valve 8. This enables accurate dosing of a quantity of powder along each powder flow 12 and 13 by subjecting the dosing valve 8 to a corresponding number of pendulum motions.

Moreover, the dosing valve 8 can also be moved to an open position, where the dosing valve 8 extends at least part of the way next to the dosing opening 6 such that the latter is at least partly clear. This open position enables powder 3 to flow out of the hopper 1 through the dosing opening 6 and thus enables quick emptying of the hopper 1 without dosing powder.

Figure 2:
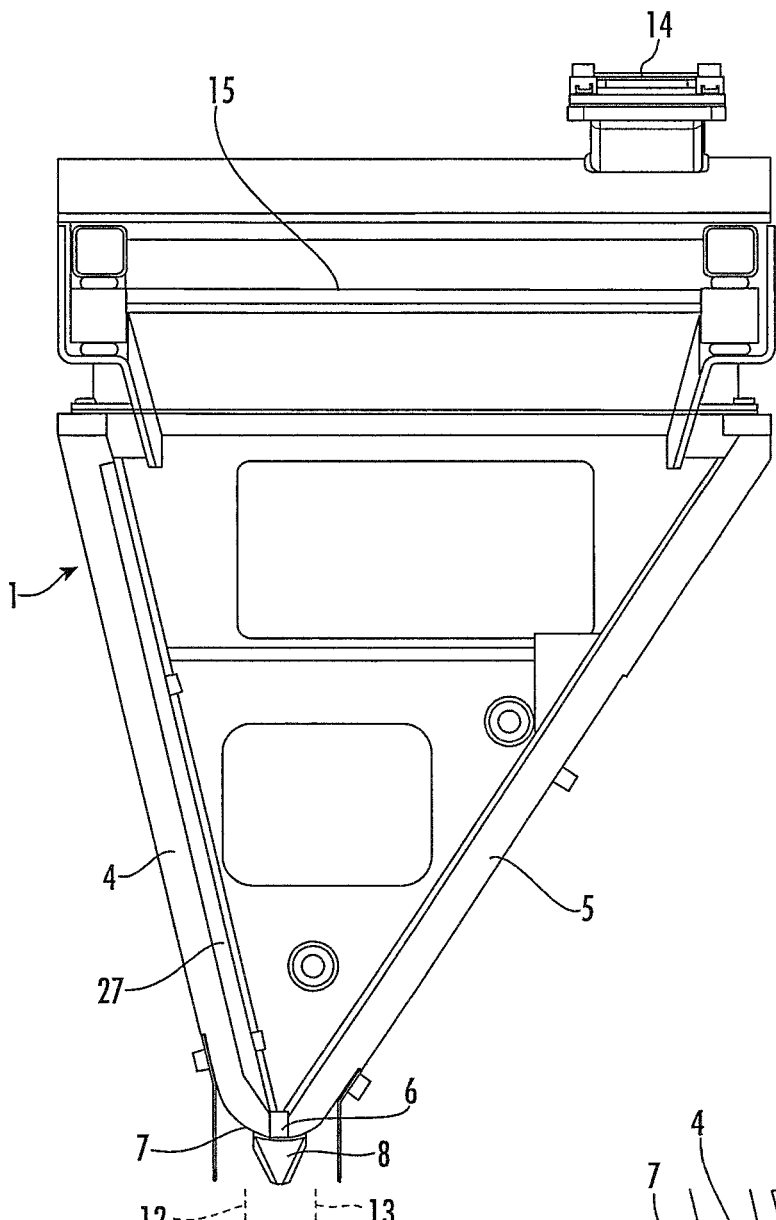
FIG. 2 is a schematic of a cross-section of the hopper from FIG. 1 where this is fitted with a screening device.

As shown in FIG. 2, the hopper 1 features an inlet 14 on the top that lets out onto a screening device with a screen 15. The latter is somewhat inclined and may be subject to a vibrating motion so that powder that ends up on the screen 15 via the inlet 14 is separated into a production fraction, which is suitable for the manufacture of the product, and a rejected fraction. The production fraction falls through the screen 15 and flows to the hopper 1, while the rejected fraction is removed to a discharge via the inclined surface of the screen 15.

The presence of the screen 15 enables simple, and possibly continuous, addition of small quantities of powder to the contents of the hopper 1. Here, for instance, the powder can be transported to the inlet 14 from a storage tank that is also located in the build chamber, for instance. The production fraction of the powder is thus continuously supplied into the hopper 1 via the screen 15, while the rejected fraction with impurities is removed. During manufacture of a product, powder 3 can therefore be filled continuously into the hopper 1.

This hopper 1 works in combination with said powder dispenser 2 as shown in the diagram in FIGS. 4 and 5. The powder dispenser 2 can be moved over the build surface 16 to apply the successive powder layers to this build surface 16.

The build surface 16 is a horizontal surface on which the powder layer that will be covered by the energy beam must be applied. This build surface extends above the build platform and parallel to the latter. After the energy beam has moved over the powder layer in order to create a layer of the product, the build platform is moved downwards over a distance that corresponds to the thickness of the powder layer. In this case, the top of the powder layer already applied with the created layer of the product extends into the build surface 16. Next, a subsequent powder layer is applied to the build surface 16 to create a subsequent layer of the three-dimensional product using said energy beam. In this way, successive contiguous layers of the product are created until the complete product is built.

The powder dispenser 2 can be moved back and forth over the build surface 16 along a horizontal dispensing direction over at least the complete width of the build platform. Here, the hopper 1 is located laterally next to a side of the build platform, where the longitudinal axis of said dosing opening 6 extends transverse to the dispensing direction. The powder dispenser 2 can be moved to under the hopper 1, where the powder dispenser 2 is located in a filling position. From this filling position, the powder dispenser can be moved to a position on the side of the platform opposite the hopper 1. Thus, the powder dispenser 2 can be moved from the filling position to the opposite side of the build platform according to the dispensing direction as indicated by arrow 17 in FIG. 5. The powder dispenser 2 can then be moved back to the filling position in said dispensing direction, as indicated by arrow 18 in FIG. 6.

Figure 6:
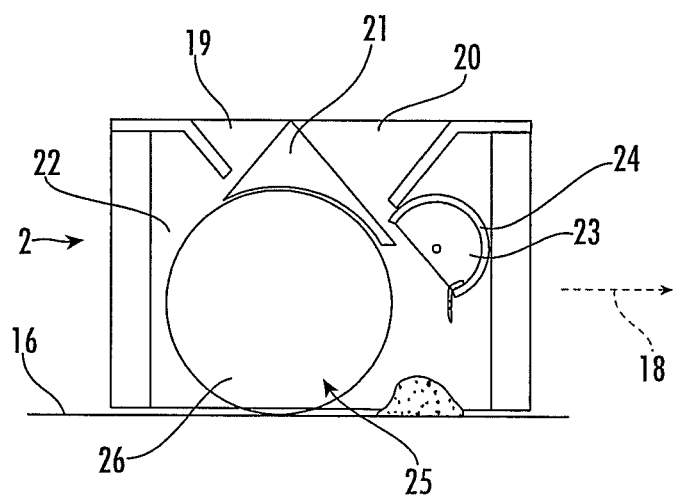
FIG. 6 is a schematic cross-section of a powder dispenser, where powder from said second compartment has flowed to the build surface.

According to the embodiment of the invention shown in FIGS. 4 to 6, the powder dispenser 2 has two inlet openings 19 and 20 for said powder, between which a separator 21 extends. Each of the inlet openings 19 and 20 lets out onto a corresponding compartment 22 and 23.

The separator 21 extends over practically the entire length of the powder dispenser 2 and parallel to the longitudinal axis of the dosing opening 6. Here, the top of the separator 21 is wedge-shaped, where the point of the wedge faces upwards. In said filling position, the separator 21 extends practically centered under the dosing opening 6 so that each of the inlet openings 19 and 20 is located on the opposite side from the dosing opening 6. When the dosing valve 8 is moved to a dosing position, this enables powder from the dosing space 9 or 10 on the side opposite the dosing opening 6 to flow to the side to which the dosing valve 8 is moving, to the inlet opening 19 or 20 located under this dosing space 9 or 10.

A first compartment 22 of the powder dispenser 2 lets out onto the build surface 16. Powder that flows via the inlet opening 19 to this first compartment 22 is collected on the build surface 16.

The second compartment 23 can be closed on the bottom so that it can store a quantity of powder 3. More specifically, the floor of this second compartment 23 features closing means 24 in order to close this floor when the powder dispenser 2 is in the filling position.

In the embodiment shown in FIGS. 4 to 5, this closing means 24 is made up of a cylindrical pipe from which part of the pipe wall has been removed over the entire length. This pipe can be rotated around its center axis and, in closed position, forms an elongated receptacle for powder, thus forming said floor. In order to open the floor of the second compartment 23, the pipe is rotated around its axis such that powder is tipped out of the pipe and flows to the build surface 16.

In order to dispense powder over the build surface 16 in this manner with the powder dispenser 2, to create successive powder layers on it, the powder dispenser 2 is moved to said filling position. Next, the dosing valve 8 executes a specific number of pendulum motions in order to generate two powder flows 12 and 13 with a predetermined quantity of powder. Powder from a first powder flow 12 is therefore collected in the first compartment 22, while powder from the second powder flow 13 ends up in the second compartment 23, more specifically in said pipe. The quantity of powder moved by each powder flow to each of the compartments 22 and 23 is at least equal to the quantity of powder required to apply a powder layer on the build surface 16 above the build platform.

From the filling position, the powder dispenser 2 is then moved over the build surface 16 to the opposite side of the build platform according to the direction of arrow 17 from FIG. 5. Due to this movement of the powder dispenser 2, powder from said first compartment 22 that is on the build surface 16, is dispensed over the latter. For this, the powder dispenser 2 contains a dispensing member 25 that extends to the build surface 16 for uniform dispensing of powder in a powder layer on the build surface 16. In the proposed embodiment of the powder dispenser 2, the dispensing member 25 is made up of a cylindrical roller 26 whose axis extends transverse to the dispensing direction.

This cylindrical roller extends to a distance from the build surface 16 that corresponds to the height of a powder layer to be applied. During movement of the powder dispenser 2 over the build surface 16, the roller 26 therefore ensures that the powder from the first compartment forms a uniform and homogeneous powder layer. The use of a roller 26 of this kind as a dispensing member 25 for powder is known to skilled persons. This roller may be combined with, or replaced with, a scraper that is moved above the build surface 16 in a manner known to skilled persons.

When the powder dispenser 2 has reached the side of the build platform opposite the hopper 1, the powder from the first compartment is practically completely dispensed into the powder layer that has been created.

Next, said closing means 24 is opened by rotating the pipe around its axis. More specifically, drive means are provided, such as an electric motor, to open said closing means 24 when the powder dispenser is located on the side of the build platform opposite the hopper 1. Powder from said second compartment 23 is therefore tipped onto the build surface 16 from said pipe, as shown in FIG. 6.

Next, the powder dispenser 2 is moved back to the filling position in the direction of arrow 18 in FIG. 6, while the powder originating from the second compartment 23 is dispensed in a subsequent powder layer over the build surface 16 by means of the dispensing member 25.

In order to prevent uncontrolled movement of the powder in the hopper when placing the build chamber under low pressure with the hopper extending into it, the hopper 1 is fitted with a bleed channel 27. This bleed channel 27 connects to the build chamber and extends into the vicinity of the dosing opening 6 on the inside of the hopper 1. Air that is in the powder 3 that is present in the hopper 1 is thus evacuated through this bleed channel 27 when reducing the air pressure in the build chamber and/or in the hopper 1.

The bleed channel 27 is made up of a space that extends into a double wall of the hopper 1 and that is open in the vicinity of the dosing opening 6. Of course a bleed channel can also be provided in other ways, such as by an open pipe that extends into the hopper from the vicinity of the dosing opening into the build chamber, for instance.

The invention is of course not restricted to the devices or methods described above or to the embodiments proposed in the accompanying figures. For example, the various features of these embodiments and variants may be combined with one another.

Despite the fact that the bottom 7 of the hopper 1 in the embodiment of the invention described above features a cylindrical surface, this bottom may also take other shapes, such as flat. In this case, for instance, the surface of the dosing valve 8 located opposite can also be flat.

For some applications, the dosing valve 8 can also move back and forth between the intermediate position and just one dosing position so that only one dosed powder flow is created.

The device and the method, according to the invention, may be applied in a large number of different techniques for additive manufacturing of a product.

Thus, the invention may be used in techniques such as Selective Laser Melting (SLM), Selective Laser Sintering (SLS) and Electron Beam Additive Manufacturing (EBM) as well as in other techniques where successive powder layers are covered by an energy beam, such as a laser beam, in order to melt powder in these layers in whole or in part and subsequently solidify or sinter it to create successive contiguous layers of product.

In production methods of this kind, after application of each powder layer, at least an energy beam, such as a laser beam, must be moved over the powder layer in order to melt powder from this powder layer at least in part and solidify or sinter it to create a layer of product. The build platform is then moved downwards over a distance that corresponds to the thickness of a powder layer in order to dispense a subsequent powder layer on the build surface and thus create successive contiguous layers of the product.

The invention may however also be applied in the same way in additive manufacturing techniques where a binder or selective energy absorber or energy reflector is printed onto the powder, possibly in combination with exposure of the powder layer to a radiation source. In general, the invention may be applied in any production technique where successive powder layers must be deposited.

What is claimed:

1. A device for layered manufacture of at least a three-dimensional product based on a powder by an additive manufacturing technique, with a build chamber with a vertically movable build platform on which said product is manufactured, a powder dispenser for application of successive powder layers above the build platform in a horizontal build surface, where this powder dispenser can be moved back and forth over the build surface along a horizontal dispensing direction, a hopper that must contain said powder to supply powder to said powder dispenser, where this hopper features a bottom in which a dosing opening is provided that lets out into said build chamber and that works in combination with a dosing valve, wherein the intermediate position of the dosing valve, said dosing opening is completely covered by the dosing valve that extends laterally along both sides of the dosing opening over the bottom of the hopper, where a dosing space is present along both sides of the dosing opening between this bottom and the dosing valve, wherein the dosing spaces present practically the same volume in said intermediate position, where the dosing valve has opposite edges extending along both sides of the dosing opening and situated at a level that corresponds to the level of the dosing opening or above this level, where the dosing valve can go to a dosing position along both sides of the intermediate position, where the dosing valve can be moved back and forth between the two dosing positions, while the dosing opening is completely covered by the dosing valve, where, in said dosing positions of the dosing valve, the volume of the dosing space on a side of the dosing opening is less than the volume of this space in the intermediate position, while on the opposite side of the dosing opening, the volume of the opposite dosing space is larger than the volume of the latter in the intermediate position.

2. A device according to claim 1, wherein, due to the movement of the dosing valve to a dosing position, the volume of the dosing space is reduced on the side of the dosing opening opposite the side to which the dosing valve moves, while the volume of the dosing space increases on the latter side.

3. A device according to claim 1, wherein both dosing spaces continuously remain connected to said dosing opening while moving the dosing valve between both dosing positions such that powder can flow from the hopper to at least one dosing space during said movement.

4. A device according to claim 1, wherein said dosing space is formed by a dosing slit with a practically constant height that corresponds to the distance between said dosing valve and the bottom of said hopper.

5. A device according to claim 1, wherein said bottom features a cylindrical convex surface, while the opposite surface of the dosing valve is concave cylindrical.

6. A device according to claim 1, wherein the dosing valve is located primarily on a first side of the dosing opening in a first dosing position and on a second, opposite side of the dosing opening in a second dosing position.

7. A device according to claim 1, wherein the dosing valve is movable with respect to the dosing opening to an open position where the dosing valve extends at least part way next to the dosing opening such that the latter is at least partly clear and powder can flow out from the hopper through the dosing opening.

8. A device according to claim 1, wherein said dosing valve is mounted so it can rotate and thus may be subject to a pendulum motion between said dosing positions.

9. A device according to claim 1, wherein the dosing opening contains an elongated recess in the bottom of the hopper, where the dosing valve is movable along a path that extends transverse to the longitudinal axis of said recess or of the dosing opening.

10. A device according to claim 1, wherein the dosing valve can rotate around an axis of rotation that is parallel to a longitudinal axis of the dosing opening.

11. A device according to claim 1, wherein the hopper features an inlet on the top that lets out onto a screening device with a screen to separate powder into a production fraction, which is suitable for manufacture of the product and that contains powder that flows through the screen and is collected in the hopper, and into a rejected fraction, which is removed from the hopper via the surface of said screen.

12. A device according to claim 1, wherein said hopper extends laterally next to said build platform and where said powder dispenser contains at least two inlet openings for said powder between which a separator extends, where each inlet opening lets out onto a corresponding compartment, while the powder dispenser can be moved to a filling position in which the separator extends practically centered under said dosing opening so that each of said inlet openings extends on a side opposite the dosing opening in order to enable powder from the dosing space on the side opposite the dosing opening to flow to the side to which the dosing valve is moving, to the inlet opening located under this dosing space when the dosing valve is moved to a dosing position.

13. A device according to claim 12, wherein a first compartment of the powder dispenser lets out onto the build surface, while a second compartment can be closed on the bottom such that a quantity of powder can be stored in this second compartment.

14. A device according to claim 12, wherein a floor of at least said second compartment features closing means in order to close said floor when the powder dispenser is in said filling position.

15. A device according to claim 14, wherein drive means are provided to open said closing means when the powder dispenser is located on the side of the build platform opposite the hopper in order to enable powder to flow from said second compartment to the build surface.

16. A device according to claim 12, wherein the powder dispenser contains a dispensing member that extends up to said build surface for uniform dispensing of powder in a powder layer on the build surface during movement of the powder dispenser over the build surface, where this dispensing member contains a cylindrical roller and/or a scraper.

17. A device according to claim 16, wherein said dispensing member extends between said compartments and where said first compartment is located between said second compartment and the build platform when the powder dispenser is placed in said filling position.

18. A device according to claim 1, where said hopper contains a bleed channel that connects to said build chamber and extends into the vicinity of said dosing opening on the inside of the hopper, where this bleed channel allows the evacuation of air located in the powder present in the hopper when lowering the air pressure in the build chamber and/or in the hopper.

19. A device according to claim 18, wherein said bleed channel contains a space that extends into a double wall of the hopper.

20. A method for the manufacture of at least a three-dimensional product by an additive manufacture technique, where successive powder layers are dispensed onto a build surface above a build platform,
   where powder for the manufacture of said product is supplied to a hopper and the powder from the hopper flows to a powder dispenser, where the powder dispenser moves over said build surface to apply a powder layer to the build surface,
   where a dosing valve is provided extending in front of a dosing opening of the hopper and the powder flows from the hopper through the dosing opening to the dosing valve, wherein between the dosing valve and the bottom of the hopper, at both sides of the dosing opening, a dosing space is created, where the dosing valve is moved between a first and a second dosing position wherein in each dosing position a corresponding powder flow is generated,
   characterized in that, when moving the dosing valve to the first dosing position, a first powder flow is generated by making the powder flow from the first dosing space over a first edge of the dosing valve and thus the first dosing space is emptied at least partially while powder flows simultaneously through the dosing opening to the second dosing space to fill this space at least partially,
   wherein a second powder stream is then generated by moving the dosing valve to the second dosing position where powder flows from the second dosing space over a second edge of the dosing valve such that the second dosing space is at least partially emptied while powder flows simultaneously through the dosing opening to the first dosing space to fill this space at least partially, where the dosing valve is moved back and forth to each of both dosing positions in order to generate at each of said edges a corresponding powder flow, where, during the displacement of the dosing valve between said dosing positions, each of said edges is maintained at a level that is equal to, or higher than, the level of the dosing opening, while each edge is kept at a corresponding side of the dosing opening such that the dosing opening remains covered by the dosing valve.

21. A method according to claim 20, wherein two separate powder flows are created from the hopper by moving the dosing valve in combination with said dosing space along a back and forth axis between two dosing positions so that powder, under the influence of gravity, flows out of the dosing space alternating between opposite ends of the dosing space, thus generating a corresponding powder flow on each end, while powder is concurrently supplied from the hopper to the dosing space.

22. A method according to claim 21, wherein said powder dispenser contains at least a first compartment and a second compartment with corresponding inlet openings for said powder, where said powder dispenser is moved to a filling position under the hopper and each of the powder flows through an inlet opening to the corresponding compartment.

23. A method according to claim 22, wherein powder flows from said first compartment to said build surface while said powder dispenser is located in the filling position, while powder is stored in said second compartment.

24. A method according to claim 23, wherein powder from said first compartment is dispensed on a build surface by moving said powder dispenser over this build surface to an opposite side of the build platform, while the powder stored in said second compartment is transported to this opposite side with the powder dispenser.

25. A method according to claim 24, wherein on said opposite side, powder from the second compartment is applied to the build surface and dispensed over the build surface to create a subsequent powder layer, while said powder dispenser is moved back to the filling position.

26. A method according to claim 20, wherein said dosing valve is submitted to a pendulum movement between said dosing positions to create said powder flows, while a fixed distance is maintained between the bottom of the hopper and the dosing valve.

* * * * *